United States Patent [19]

Geisler

[11] Patent Number: 5,274,998
[45] Date of Patent: Jan. 4, 1994

[54] ROCKET POLLUTION REDUCTION SYSTEM

[75] Inventor: Robert L. Geisler, Tenachapi, Calif.
[73] Assignee: Wyle Laboratories, El Segundo, Calif.
[21] Appl. No.: 911,184
[22] Filed: Jul. 6, 1992
[51] Int. Cl.⁵ ............................................. F02K 9/00
[52] U.S. Cl. ........................................ 60/220; 60/254; 60/264
[58] Field of Search .............. 60/204, 220, 251, 253, 60/254, 264; 55/71; 423/240; 588/203, 209

[56] References Cited

U.S. PATENT DOCUMENTS

| | | |
|---|---|---|
| 2,968,148 | 1/1961 | Rocchini . |
| 2,987,873 | 6/1961 | Fox . |
| 3,068,641 | 12/1962 | Fox ................................... 60/220 |
| 3,136,119 | 6/1964 | Avery . |
| 3,158,061 | 11/1964 | Lager ................................ 60/253 |
| 3,178,885 | 4/1965 | Loughran ........................ 60/251 |
| 3,257,802 | 6/1966 | Kaufman . |
| 3,287,911 | 11/1966 | Klein . |
| 3,328,964 | 7/1967 | Williams . |
| 3,349,562 | 10/1967 | Williams ......................... 60/251 |
| 3,354,647 | 11/1967 | Aycock ........................... 60/220 |
| 3,491,539 | 1/1970 | Mangum . |
| 3,779,008 | 12/1973 | Henderson . |
| 4,338,785 | 7/1982 | Skala ............................ 60/39.461 |
| 4,840,024 | 6/1989 | McDonald ................... 60/39.461 |
| 4,990,317 | 2/1991 | Mak et al. ..................... 423/240 R |
| 5,019,175 | 5/1991 | Rogers et al. ................ 423/DIG. 20 |
| 5,097,774 | 3/1992 | Lauwers ....................... 423/DIG. 20 |

FOREIGN PATENT DOCUMENTS 358060117  4/1983  Japan ................................ 588/209

Primary Examiner—Richard A. Bertsch
Assistant Examiner—Timothy S. Thorpe
Attorney, Agent, or Firm—Arthur Freilich; Robert D. Hornbaker; Leon D. Rosen

[57] ABSTRACT

A system is provided for reducing the emissions of hydrochloric acid (HCl) from solid fuel rockets, especially during ground disposal. An aqueous solution (40, FIG. 2) of an alkali metal hydroxide is injected as a mist (50) into the rocket chamber (32) as the rocket fuel (30) is burned. The reaction of the alkali metal with hydrogen chloride (HCl) produces a salt and thereby minimizes the presence of hydrochloric acid in the rocket exhaust. An injected neutralizing material which reduces hydrochloric acid, but which produces less thrust than an equal weight of rocket fuel, can be injected into an operating rocket which carries a payload high above the earth, with the injected material being injected only while the rocket is at a lower altitude when hydrochloric acid is most undesirable. The injected material can be produced by a small auxiliary rocket device (82, FIG. 4) whose exhaust (84) is delivered directly to the main rocket chamber (86), and with the exhaust of the auxiliary rocket device including a high proportion of magnesium to react with the hydrochloric acid with minimal degradation of rocket performance.

7 Claims, 1 Drawing Sheet

U.S. Patent
Jan. 4, 1994
5,274,998
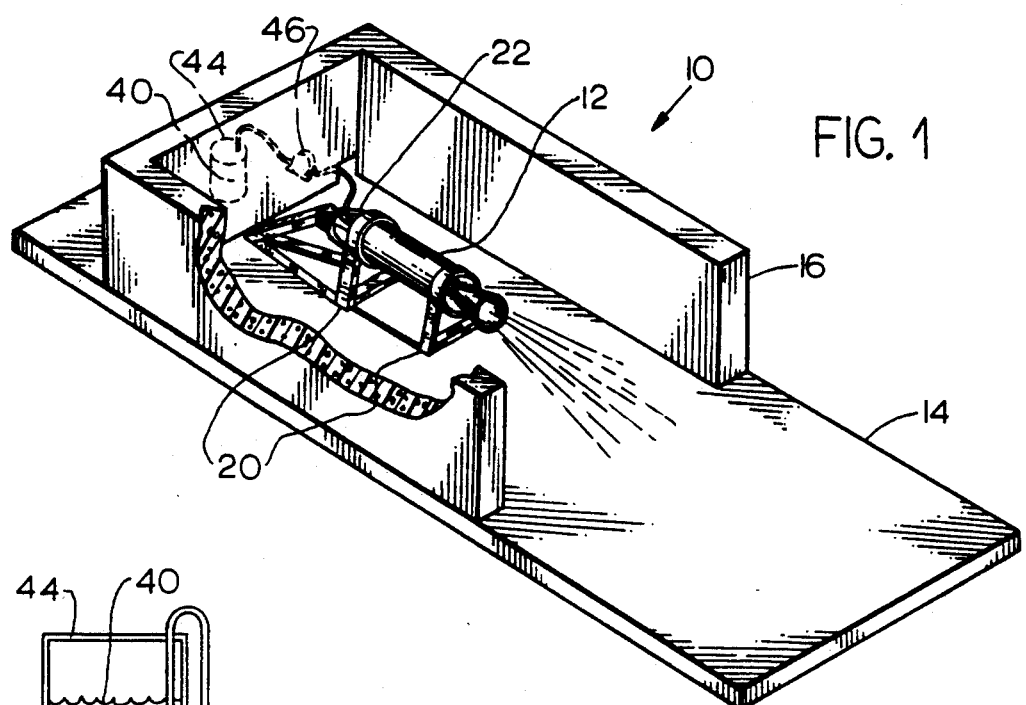
FIG. 1
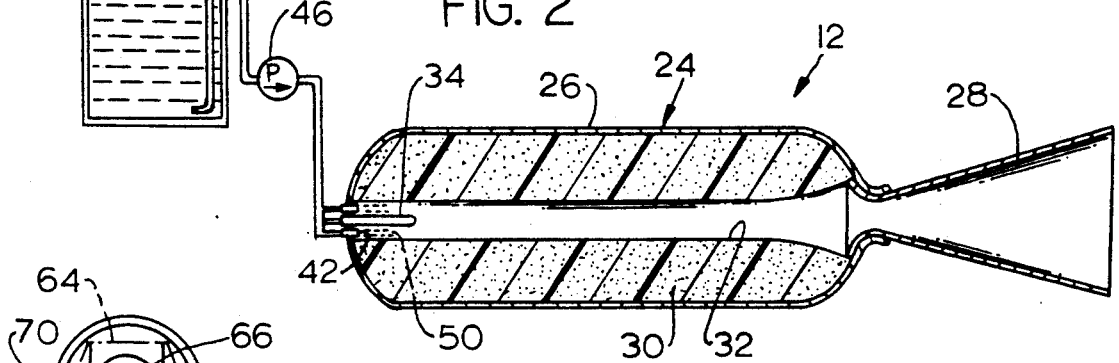
FIG. 2
FIG. 3
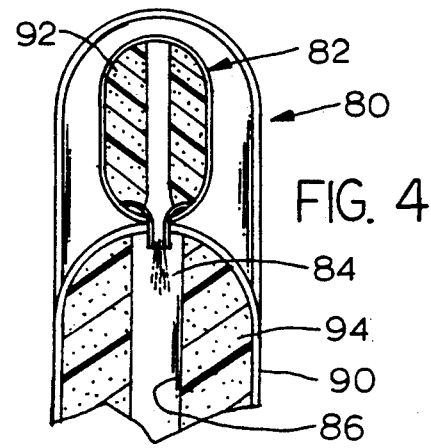
FIG. 4

ROCKET POLLUTION REDUCTION SYSTEM

BACKGROUND OF THE INVENTION

Solid fuel rockets have typically consisted (by weight) of about 23% ammonium perchloride ($NH_4ClO_4$), about 15% aluminum powder, and about 12% of a polymeric binder such as a butadiene rubber. The exhaust gas contains roughly twenty per cent by weight of hydrogen chloride (HCl), which is often referred to as hydrochloric acid. With mounting concerns about pollution, there has been increased objections to the firing of such rockets. The firings can be for use of the rockets to carry a payload, or to dispose of the rocket fuel. Disposal of rocket fuel has recently become of increased importance due to disarmament. Because of the danger in handling the solid fuel, it is generally preferred to dispose of the fuel by burning the rocket while held to the ground. A method and apparatus which minimized the emission of the most objectionable pollution component, hydrochloric acid, would increase acceptance of rocket burning for disposable or other purposes.

There have been suggestions that neutralizing material such as particles of magnesium or sodium nitrate, be mixed with the fuel in the manufacture of future rockets. Such neutralizing material is compatible with the existing fuel (does not significantly reduce storage life). However, such proposals for future rockets do not avoid the pollution produced in burning the large number of existing rockets.

SUMMARY OF THE INVENTION

In accordance with one embodiment of the present invention, a method and apparatus are provided for reducing hydrogen chloride emissions from solid fuel rockets. The system uses the rocket chamber as a chemical reactor where an injected neutralizing fluid reacts with hydrogen chloride produced by the solid fuel of the rocket. A neutralizing fluid is chosen which combines with hydrogen chloride in the rocket motor chamber to produce a salt. The neutralizing fluid produces less thrust energy (integral of thrust with time) than a comparable weight of the solid rocket motor fuel, and therefore degrade rocket performance. However, this is of no concern in simple rocket disposal, and is acceptable in other applications.

Surplus solid motor rockets are disposed of by mounting them on the ground to prevent them from moving and igniting the fuel. While the fuel burns, the neutralizing fluid is injected as a mist into the rocket chamber to rapidly combine with the products of combustion of the solid rocket fuel. The neutralizing fluid is preferable an aqueous solution of a hydroxide of an alkali metal, the preferred fluid being chosen from aqueous solutions of the following group: sodium hydroxide (NaOH), lithium hydroxide (LiOH), calcium hydroxide ($CaOH_2$), and potassium hydroxide (KOH). For a rocket which is to carry a payload high above the earth's surface, the aqueous solution can be injected into the rocket chamber only until the rocket has achieved a high enough altitude that the hydrogen chloride emissions are not too objectionable.

Where high thrust energy to weight is required, the pollution-reduction fluid can be obtained from a small auxiliary rocket device. The auxiliary rocket device fuel is rich in magnesium, and its exhaust, which includes molten and/or vaporized magnesium is directed into the chamber of the main rocket. The magnesium combines with chlorine in the main rocket chamber to minimize hydrogen chloride emissions.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified isometric view of a rocket disposal apparatus constructed in accordance with one embodiment of the present invention.

FIG. 2 is a simplified sectional side elevation view of the apparatus of FIG. 1, but without showing the support and safety wall structure thereof.

FIG. 3 is a sectional side view of a rocket system constructed in accordance with another embodiment of the invention.

FIG. 4 is a partial sectional side view of a rocket system constructed in accordance with another embodiment of the invention.

DESCRIPTION OF THE PREFERRED EMBODIMENTS

FIG. 1 illustrates a rocket disposal apparatus 10 for disposing of the fuel of a solid fuel rocket 12 by burning it while it is fixed to the ground. The apparatus includes a concrete pad 14 and concrete walls 16 surrounding the rocket on three sides to minimize damage to nearby facilities in the event of an explosion. A stand 20 supports the rocket, with a thrust adaptor 22 transferring the rocket thrust to the concrete pad.

As shown in FIG. 2, the solid fuel rocket 12 includes a rocket motor 24 comprising a motor casing 26 and an inserted nozzle 28. The casing 26, which acts as a pressure vessel, is filled with solid rocket fuel 30, except for a largely cylindrical open area or chamber 32 that may be initially filled with air or an inert gas such as nitrogen. When an igniter assembly 34 is energized, the rocket fuel combusts, or burns, creating high pressure gases in the chamber 32, which are emitted through the nozzle 28.

A solid rocket fuel that has been commonly used for many years, includes an energetic fuel component formed by aluminum powder which comprises about 15% by weight of the entire rocket fuel. An oxidizer is formed by ammonium perchloride ($NH_4ClO_4$) comprising about 73% of the weight. A polymeric binder such as butadiene rubber (consisting of a hydrocarbon) comprises about 12% of the rocket fuel weight, the binder being not as energetic as the aluminum powder, but serving to hold the other components in a solid mass. When the rocket fuel burns, about twenty per cent of the weight of the exhaust gas is comprised of hydrogen chloride (HCl), commonly referred to as hydrochloric acid. This exhaust component is often considered the worst pollutant. More recent environmental concerns have led to the desire to greatly reduce hydrogen chloride emissions.

In accordance with one aspect of the present invention, applicant provides a pollution-reduction, or neutralizing fluid 40 which is injected through a nozzle 42 into the rocket chamber 32 while the solid fuel 30 burns. The fluid 40 is chosen so that it rapidly combines with chlorine (generally displacing the hydrogen bonded to it) to produce a harmless salt. The fluid 40 can be contained in a drum 44 or other container and is pumped by a pump 46 through the nozzle 42 to create a fine spray or mist 50 of the neutralizing fluid in the rocket chamber 32. An existing igniter at 34 can be replaced by an assembly that includes an igniter and spray nozzle, to enable use of an already existing hole.

For low cost solid fuel rocket disposal, applicant prefers to use a neutralizing fluid 40 formed by a hydroxide of an alkali metal in an aqueous solution, that is, in a solution with a solvent consisting of water or other watery liquid, and an active component formed by an alkali metal hydroxide. Four suitable low cost hydroxides are sodium hydroxide (NaOH), lithium hydroxide (LiOH), calcium hydroxide ($CaOH_2$), and potassium hydroxide (KOH). Each of these hydroxides can be mixed with water to comprise between about ten per cent and about forty per cent by weight of the solution. When the aqueous solution is injected into the rocket chamber, the basic alkali metal such as sodium, combines with the acidic chlorine to produce a harmless salt such as NaCl (common table salt). Thus, surplus solid fuel rockets can be disposed of in a manner that minimizes emission of hydrochloric acid, by injecting a chlorine-neutralizing fluid into the rocket chamber while the solid fuel burns. The neutralizing fluid is of a type which combines with hydrogen chloride gas created in the rocket chamber to produce a relatively harmless salt. Thus, the rocket chamber serves as a chemical reactor to react the hydrogen chloride with the neutralizing fluid.

It may be noted that hydroxides are not compatible with the above described solid rocket fuel (it greatly decreases storage life), and could not reasonably be mixed with the other fuel components when constructing a new rocket.

The aqueous solution neutralizing fluid either reduces the rocket thrust energy (the integral of thrust with time), or adds only a small additional thrust. Even where the injected fluid adds to the thrust, the addition is much less than could be obtained by merely adding more of the original rocket fuel 32. Thus, the injected fluid degrades rocket performance. Of course, for a strapped-down rocket to be disposed of, this doesn't matter much.

In many instances, older available solid fuel rockets can be useful to deliver a payload to a high altitude, but steps are desirable to reduce hydrochloric acid pollution. FIG. 3 illustrates apparatus 60 similar to that of FIG. 2, but which is applied to a rocket 62 used to carry a payload 64. The apparatus 60 includes a spherical pressurized container 66 containing an aqueous solution of one of the four alkali metal hydroxides mentioned above. The container 66 also contains a pressurized gas for pressurizing the fluid to be injected. The aqueous solution can pass through a control valve 70 into the rocket chamber 72. A circuit 74 controls the valve 70 to allow the injection of the neutralizing fluid as soon as the solid fuel begins to combust, and until the rocket reaches a predetermined altitude (which is a plurality of hundreds of feet) or after a predetermined period of time. For example, after the rocket reaches an altitude of thirty thousand feet, at which the hydrochloric acid is not so much of a problem (because much of it will combine with components in the air before reaching ground level), the injection of the neutralizing fluid is stopped. It is possible to stop the injection of neutralizing fluid after the rocket reaches a predetermined high speed, at which the same amount of exhaust emitted each second is distributed over a larger area and may not be highly objectionable.

As mentioned above, the neutralizing fluid injected into the rocket chamber may reduce thrust, and in all cases results in a smaller thrust-time integral than can be achieved by additional rocket fuel 75 of the type already in the rocket casing. Because of the fact that only a small amount of neutralizing fluid is required, because it is injected only during the first part of rocket ascent, the weight of the fluid and associated container and other equipment can be reduced to minimize degradation of rocket performance.

FIG. 4 illustrates another rocket system 80 which includes a small auxiliary rocket device 82 whose exhaust 84 is directed into the rocket chamber 86 of the main rocket 90. The auxiliary rocket device 82 includes auxiliary rocket fuel 92 that is rich (at least 25% and preferably at least 50% by weight) in magnesium. In one example, the fuel 92 includes 65% by weight of magnesium, 10% by weight of naphthalene, and 25% by weight of sodium nitrate. When the auxiliary fuel 92 is burned, its exhaust 84 includes about 40% to 50% magnesium in the form of molten droplets and/or gas. The magnesium mist reacts with chlorine in the rocket chamber 86 of the main rocket to produce magnesium chloride (MgCl) which is a relatively harmless salt. The combining of magnesium with chlorine produces additional gas pressure in the rocket chamber 86, which enhances the thrust of the rocket. Thus, the auxiliary rocket device 82 increases the performance of the rocket, although not as much as would be achieved by an equal weight of the main rocket fuel 94 (of aluminum with ammonium perchloride and a polymeric binder). However, the performance is greater than is achieved by an equal weight of an aqueous solution of an alkali metal hydroxide.

The pressure of the exhaust 84 of the auxiliary rocket device 82 must be greater, and preferably 50% to 100% greater than the pressure of gas in the main rocket chamber 86 when the main rocket fuel 94 is burning. The pressure in the main rocket chamber 86 may vary between about twenty and two hundred atmospheres, while the temperature of the gases may vary between about two thousand and four thousand degrees Kelvin.

The amount of neutralizing fluid injected into the rocket chamber, is preferably a stoichiometric amount, that is, an amount which can combine with substantially all chlorine, without any of the active material of the injected fluid or any of the chlorine being left over. Nearly complete neutralization of the chlorine requires effective mixing of the neutralizing material with the main rocket exhaust while both are in the rocket chamber. The injection of the neutralizing material into the vigorously churning turbulent gases in the rocket chamber serves to achieve this goal.

Thus, the invention provides a method and apparatus for minimizing hydrochloric acid pollution from the burning of a solid fuel rocket. This is accomplished by injecting a pollution-reduction, or neutralizing, fluid into the rocket chamber while the solid fuel is burning therein. A component of the neutralizing fluid combines with chlorine produced by the rocket fuel, to produce a relatively harmless compound such as a salt. In all cases the injected neutralizing fluid degrades rocket performances because it produces less additional thrust energy than could be obtained by the same weight of the rocket fuel. Where the reduced performance is of small or no concern, then an aqueous solution can be injected. Four preferred low cost pollution-reduction materials are aqueous solutions of hydroxides of sodium, lithium, calcium, and potassium. Even where the rocket is used to loft a payload, the reduction in rocket performance is minimized by injecting the material only when the rocket is at a low altitude, with the injection being stopped when the rocket rises above a low altitude. Where higher rocket performance is desired, an auxiliary rocket device can be used, which generates a large proportion of magnesium in its exhaust, with the exhaust directed into the chamber of the main rocket.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A method for disposing of the fuel of a solid fuel rocket which includes a rocket motor chamber containing said fuel and a gas-filled space, where said fuel lies in a casing and includes hydrogen and chlorine so the exhaust gases can include hydrogen chloride, comprising:

burning said fuel primarily within said rocket motor chamber;

injecting a thrust-inefficient neutralizing fluid from outside said casing into said gas-filled space of said rocket motor chamber while said fuel burns, wherein said fluid combines with chlorine of said hydrochloric acid to produce a salt, *and* wherein said fluid is thrust-inefficient in that it is of a chemical composition which results in said fluid producing less thrust energy than an equal weight of said fuel.

2. The method described in claim 1 including:

securing said rocket to the ground to prevent movement of said rocket, prior to and during burning of said fuel.

3. The method described in claim 1 including:

allowing said rocket to rise high above the earth's surface by the thrust produced by burning said fuel;

said step of injecting a neutralizing fluid includes injecting said fluid only while said rocket is below a height of a plurality of hundreds of feet above the earth's surface, and thereafter ceasing to inject said fluid.

4. The method described in claim 1 wherein:

said step of injecting a fluid comprises injecting an aqueous solution of a metal hydroxide or carbonate into said rocket motor chamber.

5. The method described in claim 1 wherein:

said fluid is an aqueous solution of a material selected from the group consisting of: sodium hydroxide (NaOH), lithium hydroxide (LiOH), calcium hydroxide ($CaOH_2$), and potassium hydroxide (KOH).

6. Apparatus for disposing of the fuel of a solid rocket that includes a rocket motor casing containing fuel that includes hydrogen and chlorine, to minimize the amount of hydrochloric acid in the exhaust, comprising:

a rocket firing installation which can hold said rocket stationary on the ground while said fuel is burned;

a container of an aqueous solution which combines with hydrochloric acid to produce a salt;

means for injecting said aqueous solution into said rocket motor chamber, to react with said fuel as it burns.

7. The apparatus described in claim 6 wherein:

said aqueous solution includes a watery solvent and an active component chosen from the group which consists of sodium hydroxide (NaOH), lithium hydroxide (LiOH), calcium hydroxide ($CaOH_2$), and potassium hydroxide (KOH).

* * * * *